(12) United States Patent
Apodaca et al.

(10) Patent No.: US 6,300,956 B1
(45) Date of Patent: Oct. 9, 2001

(54) STOCHASTIC LEVEL OF DETAIL IN COMPUTER ANIMATION

(75) Inventors: Anthony A. Apodaca, San Rafael; Mark T. Vande Wettering, El Cerrito; Larry I. Gritz, Larkspur, all of CA (US)

(73) Assignee: Pixar Animation, Richmond, CA (US)

( * ) Notice: Subject to any disclaimer, the term of this patent is extended or adjusted under 35 U.S.C. 154(b) by 0 days.

(21) Appl. No.: 09/040,175

(22) Filed: Mar. 17, 1998

(51) Int. Cl.$^7$ ..................................................... G06T 17/00
(52) U.S. Cl. ............................................................. 345/433
(58) Field of Search ................................... 345/433, 434, 345/435, 418, 428

(56) References Cited

U.S. PATENT DOCUMENTS

| | | |
|---|---|---|
| 4,897,806 | 1/1990 | Cook et al. . |
| 5,025,400 | 6/1991 | Cook et al. . |
| 5,239,624 | 8/1993 | Cook et al. . |
| 5,367,615 | 11/1994 | Economy et al. . |

FOREIGN PATENT DOCUMENTS 2 284 526 A   6/1995   (GB) .

OTHER PUBLICATIONS

International Search Report, International Application No. PCT/US99/03742, Mar. 16, 1999.

Apodaca, Tony, et al., "Stochastic Level of Detail," *SIGGRAPH* (unpublished submission 1997), pp. 1–5.

Certain A. et al., "Interactive Multiresolution Surface Viewing," *Computer Graphics* Annual Conference Series (1996), pp. 91–98.

Clark, J.H., "Hierarchical Geometric Models for Visible Surface Algorithms," *Comm. ACM*, 19(10):547–554 (Oct. 1976).

Cook, R. L. et al, "The Reyes Image Rendering Architecture," *Computer Graphics* 21 (4):95–102, (1987).

Funkhouser, Thomas A. et al, "Adaptive Display Algorithm for Interactive Frame Rates During Visualization of Complex Virtual Environments," *Computer Graphics* Annual Conference Series (1993), pp. 247–254.

Haeberli, Paul et al., "The Accumulation Buffer: Hardware Support for High Quality Rendering," *Computer Graphics* 24 (4), pp. 309–318, (Aug. 1990).

Hoppe, Hugues, "Progressive Meshes," *Computer Graphics* Annual Conference Series (1996), pp. 99–108.

Hoppe, Hugues et al., "Mesh Optimization," *Computer Graphics* Annual Conference Series (1993), pp. 19–26.

Turk, Greg, "Re–tiling Polygonal Surfaces," *Computer Graphics* 26(2):55–64, (Jul. 1992).

*Primary Examiner*—Cliff N. Vo
(74) *Attorney, Agent, or Firm*—Arent Fox Kintner Plotkin & Kahn, PLLC

(57) ABSTRACT

A method for smoothly transitioning between different object representations in computer animation using stochastic sampling. The method allows for level of detail transitions between object representations made up of different geometric primitives, of different types, with different rendering attributes, and even different topologies without "popping" or other visual artifacts.

17 Claims, 5 Drawing Sheets

STOCHASTIC LEVEL OF DETAIL IN COMPUTER ANIMATION

BACKGROUND OF THE INVENTION

The invention relates generally to the art of computer graphics and computer generated animation. More particularly, the invention relates to the use of, and means for smoothly transitioning between, different representations of objects depending on the object's visibility and importance in the rendered scene.

In computer rendering (digital image synthesis) objects in the synthesized image must be mathematically represented in three dimensional object space. This is achieved by modeling the object's bounding surfaces as a collection of geometric primitives. Typically, the primitives are simple polygons or more complicated surface elements defined by non-linear paramatized curves (e.g. NURBS (Nonuniform Rational B-Splines)).

The realism obtainable in the resulting image depends to a large degree on the number and complexity of the primitives used to represent the objects. The flip side is that more., and more complex primitives require more computations, i.e., more time and memory. A given object, depending on its position in a scene and distance from the viewer, need not always be represented with the same level of detail. Thus, it is possible to use multiple representations of a given object with varying levels and types of primitives. One can use only a few simple primitives to describe an object when it is far away in a scene and a more complex description when it is viewed up close.

The technique of matching the complexity of the object description to the object's visibility and the limits of resolution is known generally as level-of-detail (LOD) computation. LOD schemes eliminate geometric primitives that are too small to make a significant individual color contribution to the final image, in some cases by replacing large collections of such primitives by a smaller collection of larger primitives that will generate approximately the same aggregate color contribution to the final image. A particular object representation may have a finely detailed version for close-ups, a simple version for distant shots, and perhaps several levels in between.

This has two obvious benefits to the rendering system: it reduces the total number of geometric primitives to process and it replaces tiny subpixel primitives with larger primitives that are easier to antialias because the renderer's sampling rate is less likely to be below their Nyquist limit. An early description of the usefulness of having multiple representations of a single object is found in Clark, J. H., "Hierarchical Geometric Models for Visible Surface Algorithms", *Comm. ACM,* 19(10):547–554 (October 1976). Flight simulators have used multiple levels of detail for many years to reduce scene generator workload. These simulators select among several object representations on-the-fly based on the objects actual or foveal (centrality in the pilots field of view) distance from the viewer. Similarly, Funkhouser and Sequin used multiple levels of detail to maintain a constant frame rate for interactive walkthroughs, using a cost/benefit analysis of perceived scene quality verses frame rate to select among detail levels. Funkhouser, Thomas A. and Sequin, Carlo H., "Adaptive Display Algorithm for Interactive Frame Rates During Visualization of Complex Virtual Environments", *Computer Graphics Annual Conference Series* 1993, pp. 247–254.

In both the flight simulators and Funkhouser and Sequin walkrough, the transition between object representations is instantaneous and discrete resulting in "popping", a visual artifact that is unacceptable for high quality computer animation. Attempts to smooth these transitions have focused on interpolating between the geometric representations. See, e.g., Certain A., J. Popovic, T. DeRose, T. Duchamp, D. Salesin, W. Stuetzle, "Interactive Multiresolution Surface Viewing", *Computer Graphics* Annual Conference Series 1996, pp. 91–98; Hoppe, Hugues, "Progressive Meshes", *Computer Graphics* Annual Conference Series 1996, pp. 99–108, 1996; Turk, Greg, "Re-tiling Polygonal Surfaces", *Computer Graphics* 26(2):55–64, July 1992; Hoppe, Hugues, T. DeRose, T. Duchamp, J. McDonald, W. Stuetile, "Mesh Optimization", *Computer Graphics* Annual Conference Series 1993, pp. 19–26. All of these methods depend, however, on particular geometric representations which must be used to represent the models at all detail levels. The object representations must also retain the identical topology, so that they can be related to each other by smooth interpolations. None of the prior methods allows one to create smooth transitions between representations with arbitrary modeling primitives, topologies, and shading paradigms, including smooth transitions between arbitrary three dimensional geometric representations and approximations of them using displacement or texture maps.

Another technique to obtain smooth transitions between different object representations requires rendering the images using both representations and cross-dissolving between the images at the pixel level. This technique is inefficient, requiring multiple renderings of each object, and results in poorer image quality because the visibility computation is only approximate at the whole pixel level and does not fully account for antialiasing, reconstruction filters, or motion blur already applied to these pixels. Moreover, cross dissolving between rendered scenes at the pixel level requires that all objects in the scene transition in the same manner, or else one must render a multitude of scenes with various combinations of different object representations and somehow cut and paste between them to form the desired cross dissolve.

SUMMARY OF THE INVENTION

The present invention solves the "popping problem" efficiently with results suitable for high quality animation. It allows the rendering of smooth transitions between different object representations of arbitrary type and topology without visual artifacts or discontinuities and without the need for pixel level post processing. The present invention is an extension of the elegant and powerful stochastic sampling techniques used in many high quality renders to perform spatial antialiasing, and produce motion blur, depth of field and soft shadows. These methods are described in U.S. Pat. Nos. 4,897,806; 5,025,400 and 5,239,624 entitled "Pseudo-Random Point Sampling Techniques in Computer Graphics" which are assigned to Pixar, and are incorporated herein by reference.

The conceptual underpinning of the present invention is the treatment of the level of detail (or other range over which one characterizes differing object representations) as an additional "dimension" like screen position, lens position or time, over which one approximates integration by stochastic sampling. In the disclosed embodiment, this is done by associating with each screen space sample of the object scene an additional random variable, the representation dimension deviate m. In a transition region in which more than one object representation may contribute, the object representation sampled depends on the random variable m and the weighting of the object representations within the ensemble depends on an image based selection criteria, e.g., the screen size of the object.

By combining the techniques of the present invention with those of Cook et al. one can, in a unified way without post processing or pixel level manipulations, produce smooth efficient animation incorporating multiple levels of detail, antialiasing, motion blur, depth of field and soft shadows in which visibility is correctly determined at each sub-pixel sample location.

Because in the present method individual samples are evaluated against a single LOD representation for each object, and visibility is computed correctly for each subpixel sample, it is more efficient and produces better images than can be obtained by cross-dissolving at the pixel level images separately rendered from different object representations. In addition, because the present invention does not depend on, or constrain, the details of the geometric representations of the objects, it allows one complete freedom in the definition and representation of objects. One can, for instance, transition between entirely different representations of individual objects, e.g., a highly detailed, texture mapped and trimmed NURB representation of a leaf on the one hand, and a green square on the other.

Moreover, one has complete freedom in defining the "object" for LOD purposes, and one is free to vary the definition throughout the animation. For example, one may create and store a hierarchy of different LOD representations of a forest, a tree in the forest, a branch on the tree, or a leaf on the branch, and choose independently and consistently importance criteria and detail ranges for "objects" in each level of the hierarchy. In one group of scenes the rendered object may be a tree represented by one or several LOD representations. In another group of scenes the rendered object may be a leaf on the tree. In both cases the present invention allows one to incorporate and smoothly transition between different LOD representations of either object.

DETAILED DESCRIPTION OF AN EXEMPLARY EMBODIMENT

Figure 1:
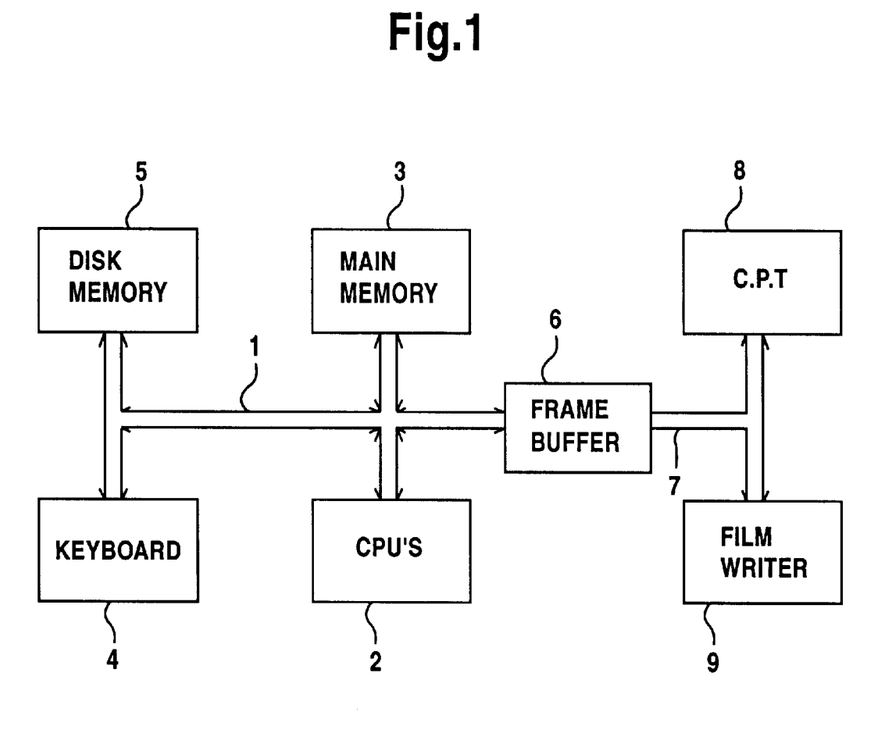
FIG. 1 shows generally the elements of a computer system suitable for carrying out the present invention.

FIG. 1 shows a computer system suitable for carrying out the invention. A main bus 1 is connected to one or more CPUs 2 and a main memory 3. Also connected to the bus is a keyboard 4 and large disk memory 5. The frame buffer 6 receives output information from the main bus and sends it through another bus 7 to either a CRT or another peripheral which writes the image directly onto film.

Figure 2:
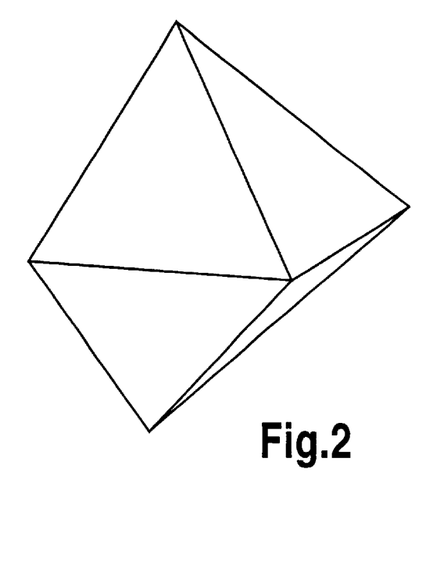
FIG. 2 shows a representation of an object as a collection of geometric primitives.
Figure 3:
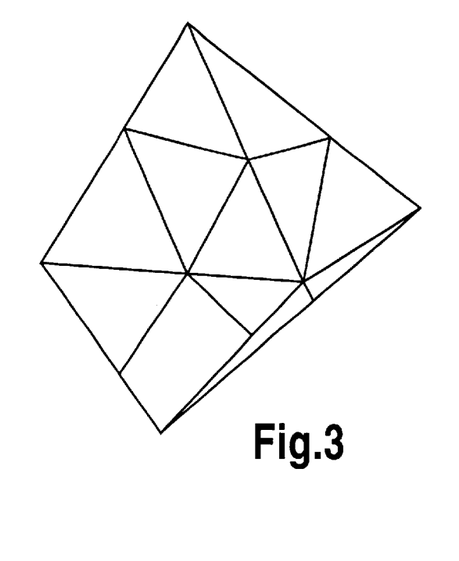
FIG. 3 shows a more complicated representation of the same object using a larger set of geometric primitives.
Figure 4:
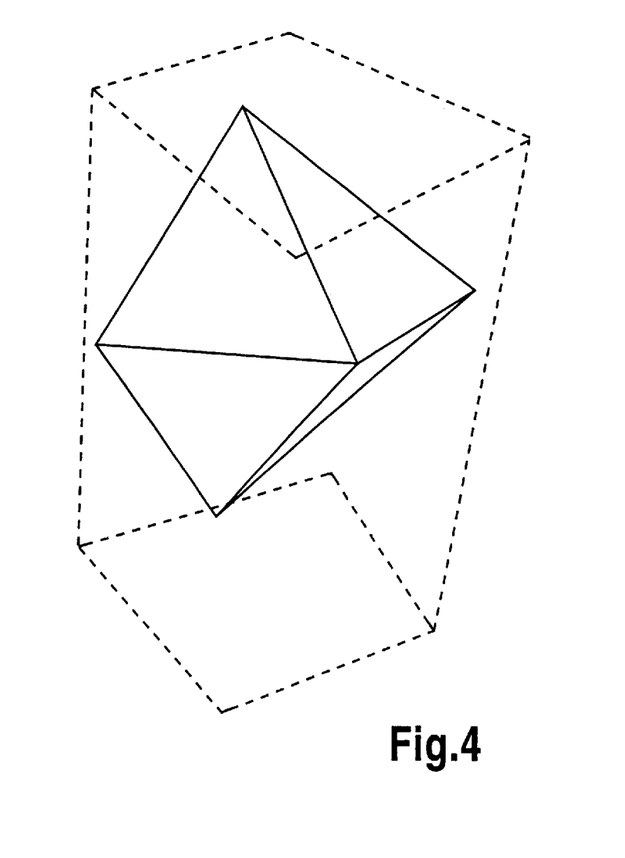
FIG. 4 shows a bounding box used to used to calculate the current detail, dc of the enclosed object.

FIG. 2 shows a simple object represented as a collection of geometric primitives. In this illustration the primitives are polygons but in practice they could be NURBs, etc. FIG. 3 shows a more detailed representation of the same object using more primitives. To determine the desired level of detail with which to represent an object in a particular scene one needs to determine an image based importance criteria. In one embodiment this is done by defining a bounding box (in practice, an axis-aligned bounding box in the current active coordinate system) for the object by specifying the coordinates [xmin xmax ymin ymax zmin zmax] as shown in FIG. 4.

Figure 5:
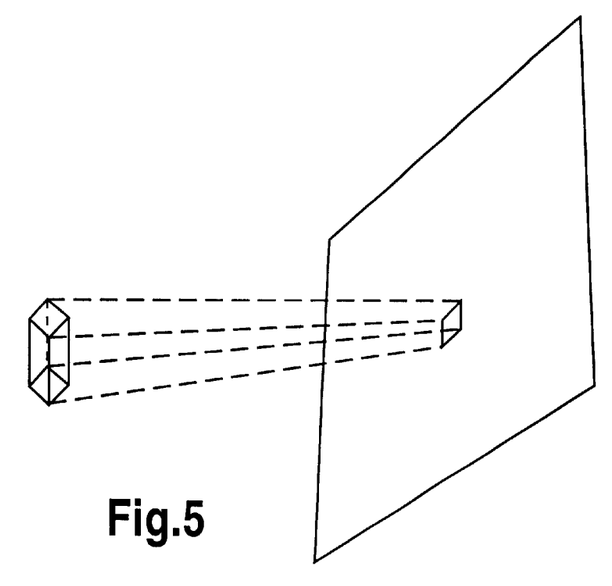
FIG. 5 shows a projection of the bounding box onto the image plane and the resulting current detail, dc.
Figure 6:
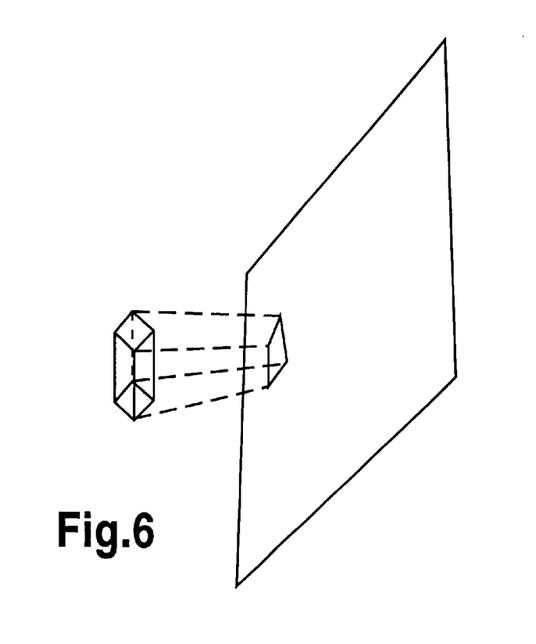
FIG. 6 shows the same object in a different location in the scene giving rise to a different value for the current detail, dc.

FIG. 5 shows the area of this bounding box, in pixels when projected onto the image plane. In the current exemplary embodiment, the raster area of this projected boundary box is the importance criteria which is defined as the current detail, dc. FIG. 6 shows dc for the same object in a different scene, when viewed from a different location.

One next defines the range of dc for which a specific LOD representation of an object is to be used. This can be done by specifying four values which define the Detail Range for that representation: minivisible, lowertransition, uppertransition, maxvisible. Three regimes are possible depending on the dc of the object in a given scene: (1) If dc<minivisible or dc>maxivisible, then that LOD representation of the object will not be used at all in rendering the scene; (2) if lowertransition<=dc<=uppertransition the LOD representation under consideration will be the only one used to render the object in the given scene; (3) if minivisible<dc<lowertransition or uppertransition<dc<maxvisible, dc is in a transitional region and the LOD representation under consideration will be one of those used to represent the object. Alternatively instead of defining different importance criteria for each object, one could use a common importance criteria for all objects or some set of objects, e.g., the raster area of the projected bounding box surrounding a particular preferred object or a feature of a particular object.

Figure 7:
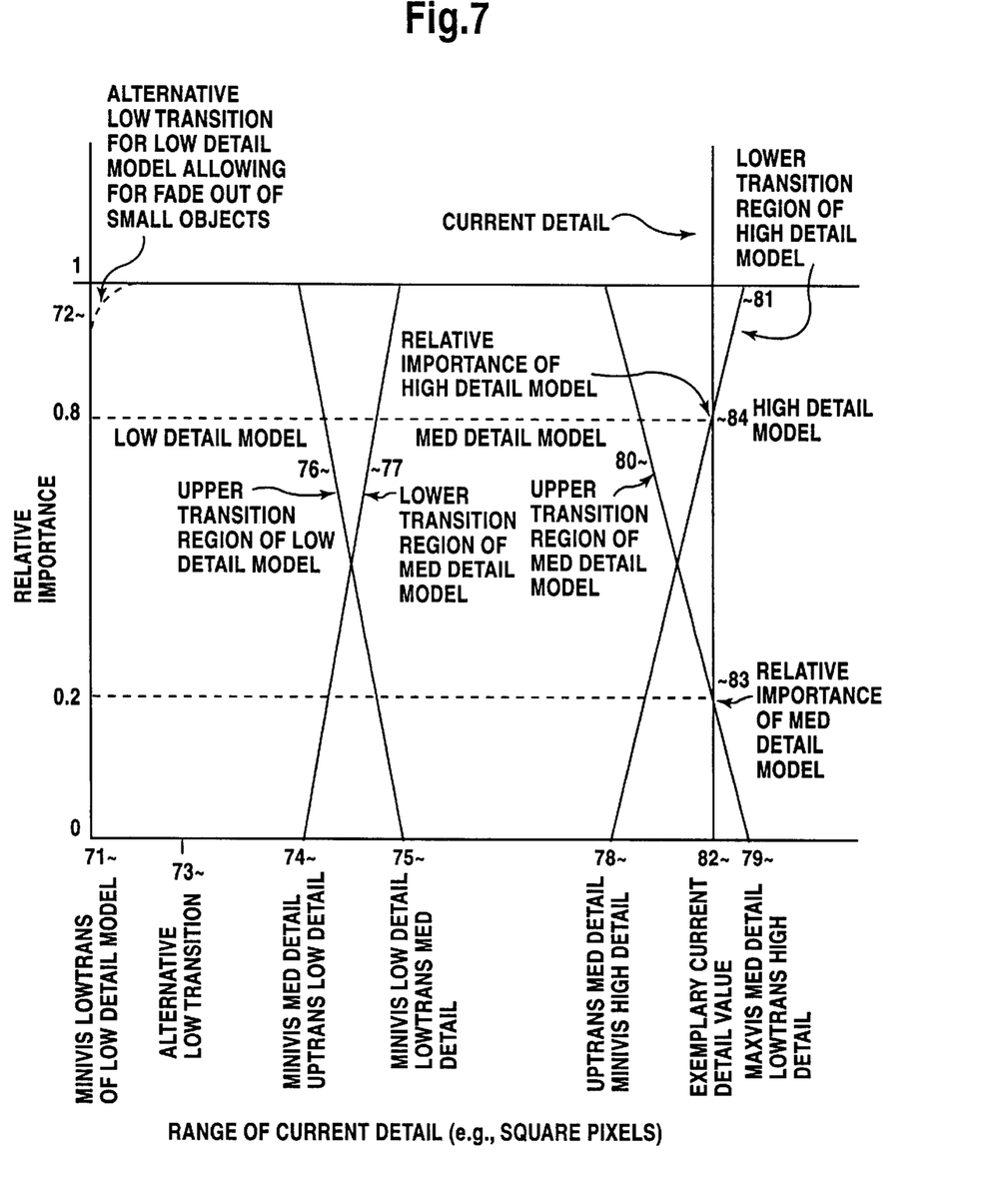
FIG. 7 is a sample graph of the LOD transitions for three representations of varying detail.

FIG. 7 shows how the current detail determines each representation's importance, defined as the relative contribution of a particular LOD representation of an object compared to other LOD representations of the same object. Where the importance is 0 that representation will not be considered, i.e., that representation's primitives will not be rendered. Where the importance is 1, only that representation and presumably no other will be considered, i.e. only its geometric primitives will be rendered. Finally, where there is a transition region and the importance of a given representation is between 0 and 1 that representation will contribute to the image as will one or more lower or higher detailed representations. FIG. 7 illustrates the case of three possible representations of the object of varying levels of detail and in which the transitions receive contributions from only two representations.

One may use as few or as many levels as desired, but the sum of the importances for all representations should be 1.0 over the entire range of potential current detail values. This requirement prevents the object from being over or under represented in any particular image. In practice, it is sometimes useful to under represent the low transition of the lowest level representation in order to have the object fade out below some minimum size.

Returning to FIG. 7 and the exemplary transition functions represented therein, the range of possible current detail is plotted on the x-axis. In the described embodiment, this is the range of raster areas (in square pixels) which could be occupied by an object in a scene and can take any value from 0 to the number of square pixels in the image. Marked along the x-axis are the points which determine the range of current detail over which the various object representations are to be utilized. 71 shows the minimum visible and low transition points for the low detail representation at 0 pixels. With this choice, the low detail representation contributes at full strength until the object disappears from the image. As discussed above, one can instead have the object fade out before it disappears by placing the low detail low transition point above zero as shown at 72 and add a low transition function as shown at 73. Because the "sum to one" rule is violated in this region, the object will be underrepresented compared to others in the scene and will thus appear to fade out before it disappears.

74 marks the minimum visible point of the medium detail representation and the upward transition point of the low detail representation. These two must occur at the same point so that the combined importance of both representations remains unity. 75 marks the maximum visible point of the low detail representation and the low transition point of the medium detail representation. For the same reason, these should be at the same point. 76 shows the importance of the low detail representation in the upper transition region. It slopes downwardly from 1 at the low detail upper transition point to 0 at the maximum visible point of the low detail representation. Similarly 77 shows the lower transition function for the medium detail representation. Again the function is linear sloping upward from 0 at the minimum visibility point of the medium detail representation to 1 at the low transition point for the medium detail representation. 78 to 81 show the corresponding points and functions for the medium to high detail transition.

In the simple implementation shown in FIG. 7, the transition functions are linear and have the same magnitude slope. Though we have found these simple functions to be satisfactory, one need not be so constrained. More complicated nonlinear (e.g., higher level polynomial or exponential) "ease-in/ease-out" transition functions may be used instead. Different transition functions may also be used for different transitions, e.g., the low to medium detail transition may use a different function than that used in the medium to high detail transition. Similarly, the range of detail values over which the transition occurs may vary depending on the transition. It may be advantageous, for instance, to have the medium to high transition be more gradual, i.e., have a contribution from both representations over a larger range of detail values, than the medium to low detail or low detail to zero transition. Additionally, though one would need a more complicated graphical representation, transitions in which more than two different object representations contribute are also possible. One need only define relative importance functions for all representations which one desires to contribute to the image in a particular current detail range. And, if a consistent representation of the object is desired, require that the importances of all representations sum to 1 for all values of the current detail.

82 in FIG. 7 shows an exemplary value of the current detail within the transition region between the medium and high detail representations. 83 shows the intersection of the current detail with the upper transition function of the medium detail representation. The y coordinate of that intersection point gives the importance of the medium detail representation at the current detail. Similarly 84 shows the intersection of the current detail with the lower transition of the high detail representation. The y coordinate of that intersection point gives the contribution of the high detail representation for that value of current detail.

Because most renderers process primitives independently, the primitives corresponding to a given object representation are tagged with the importance I of the object representation to which they belong as determined above based on the level of detail and detail range of the object representation. Primitives with values of 1 are rendered conventionally and those with values of 0 are trivially rejected.

One important insight of the present invention is that for primitives in the transition region one can think of the level of detail as an additional dimension, along with screen space position (x,y); lens position (lx,ly) and time (t) over which one integrates the image function with a metric defined by the detail ranges and transition functions shown in FIG. 7 in order to calculate the color and intensity of the image element (pixel). One can then approximate this extended integral with Monte Carlo techniques, similar to those used by Cook et al., i.e., by stochastically sampling independently in the various dimensions to determine visibility at a set of sample points and then filtering the samples to yield image pixels.

Figure 8:
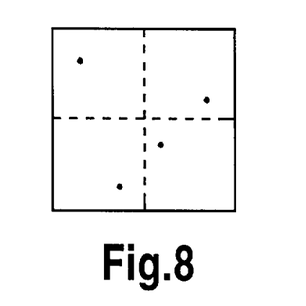
FIG. 8 shows a jittered subpixel sampling pattern.
Figure 9:
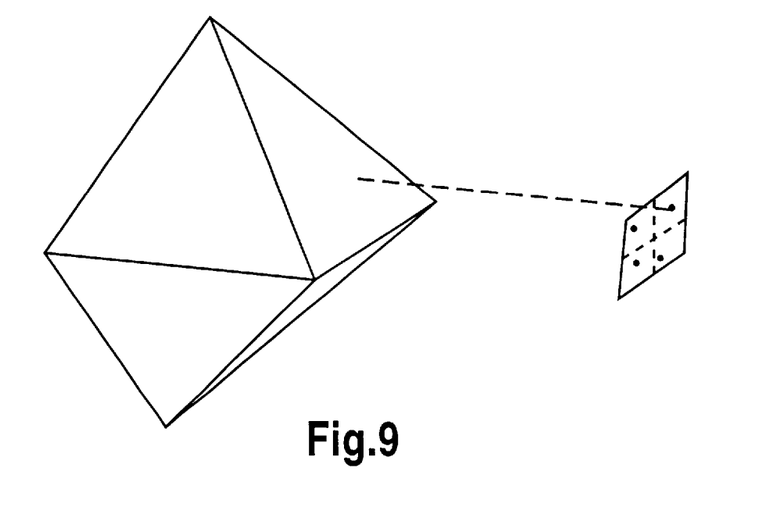
FIG. 9 shows a ray drawn from one of the subpixel sampling points intersecting a particular representation of an object.
Figure 10:
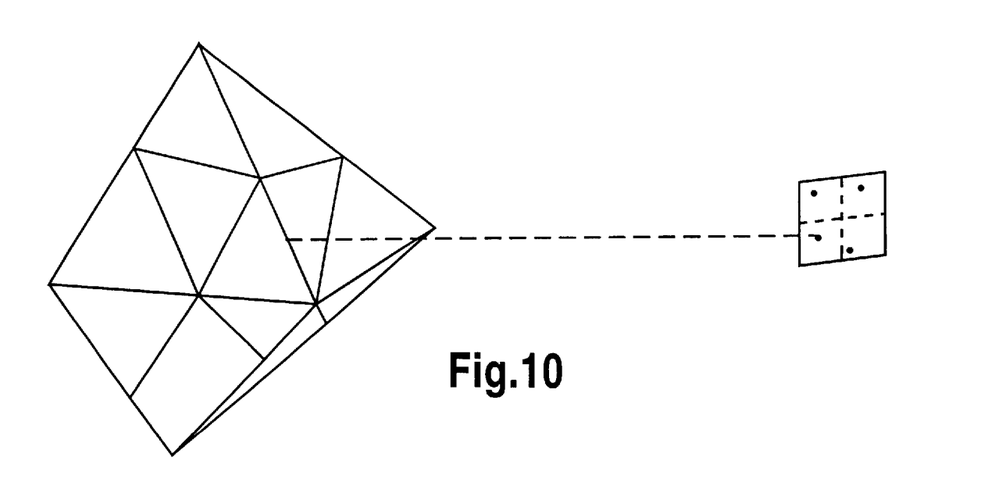
FIG. 10 shows a ray from a different subpixel sampling point intersecting a different representation of the same object.

In the method of Cook et al., screen space positions are chosen from a distribution of points in a jittered or Poisson-disc pattern. FIG. 8 shows a jittered distribution of 4 samples per pixel. Lens positions and times (within a single frame) are suitably stratified and distributed to reduce sampling discrepancy. Good sampling patterns strive to eliminate any correlation between the random variables of the various dimensions.

The present invention extends this random sampling technique and provides for smooth LOD transitions by associating an additional random variable with each screen space sample, the representation dimension deviate m which takes random values uniformly distributed between 0 and 1. Each incoming primitive in a transition region is tagged with an upper and lower range of valid m values. If, for a primitive, minivisible is<dc<maxvisible than the range is (lower=0, upper=I), and if uppertransition<dc<maxvisible, the range is (1−I, 1). Only primitives whose range encompasses that sample's m can contribute. In the example illustrated in FIG. 7, the current detail specifies that the high detail representation has importance 0.8 giving a range (0,0.8) and the medium detail representation has importance 0.2 giving a range (0.8, 1). So for a uniformly distributed m, 80% of the sample points will see the high detailed representation and 20% will see the medium detail representation.

The present invention can be implemented with all types of renderers. In a ray tracer, the screen and lens positions are combined to give the position and orientation of a ray which will be traced to yield the color for that sample. The ray is also tagged with a time, which is used when performing ray object intersection tests for moving geometry. Additionally each ray is given a representation dimension deviate m. Each ray is only tested against primitives whose upper and lower tags are such that lower<=m<upper for that ray.

Scanline and z-buffer algorithms (See, e.g., Cook, R. L., Carpenter, L. and Catmull, E., "The Reyes Image Rendering Architecture", *Computer Graphics* 21 (4):95–102, 1987) can be enhanced in a similar fashion. As primitives are loaded into the database, they are tagged with lower and upper detail ranges for which they are valid. Each subpixel sample is tagged with a representation dimension deviate m. As primitives are scanned into subpixels, they are only added to those subpixels for which the lower and upper tags are such that lower<=m<upper.

The present invention can also be used in conjunction with an accumulation buffer (See Haeberli, Paul and Akeley, Kurt, "The Accumulation Buffer: Hardware Support for High Quality Rendering", *Computer Graphics* 24 (4), pp. 309–318. August 1990) in which the final image is an average of a number of images that are separately rendered with the time, lens and spatial position independently jittered. One may extend use of the accumulation buffer so that different representations of the object are chosen for the different subimages randomly with a weighted distribution as described above. Care should be taken to so that the representation chosen for each subimage is uncorrelated with the other dimensions being varied.

In the described embodiment, a single current detail was defined per object per scene. In situations with large intraframe motion, the current detail size for an object could change radically inside a frame time. In that situation it may be useful to store each primitive's upper and lower range tags as a function of time and evaluate them at the sample time prior to comparison with the sample m.

Also in the described embodiment, the selection among representations was based solely on the raster space area of the projected object. Other factors may be used to determine the visibility or importance of an object to a scene such as viewing angle, orientation, or cost/benefit metrics as in Funkhouser and Sequin. The only change in the implementation of the invention would be the substitution of a new definition for dc.

Finally and importantly, the present invention is not limited to transitions between differing levels of detail. The invention provides for the implementation of smooth transitions, based on any desired image criteria, between object representations which vary in arbitrary ways. For instance, in representing a building in a video game one could have dc depend on the angle between the viewer and the normal to the building's surface. For small values of that angle, the building could be efficiently represented as a surface map on a single polygon. As the angle increases, e.g., as the viewer flies by the side of the building, one could transition to a more complicated three dimensional representation of the building using the techniques described above. More generally the present invention can also be used to smoothly transition between different representations of different objects, i.e., morphing. In that case dc could depend on time (frame sequence) or other parameter controlling the morphing transition being animated.

Although the various aspects of the present invention have been described with respect to an exemplary embodiment, it will be understood that the invention is entitled to protection within the fill scope of the appended claims.

What is claimed is:

1. A method for computer rendering an image, comprising:
    storing a plurality of different representations of an object in a scene to be rendered;
    selecting a plurality of sample locations within an area of a pixel of an image;
    associating with each of said sample locations one of said plurality of different representations;
    computing an image contribution at each of said sample locations based on the associated one of said plurality of different representations; and
    combining said image contributions computed at each of said sample locations to form the image.

2. The method of claim 1 wherein each of said plurality of different representations of an object comprises a set of geometric primitives.

3. The method of claim 2 wherein a plurality of said sets of geometric primitives are of different types.

4. The method of claim 3 wherein said sets of geometric primitives are bound with differing rendering attributes.

5. The method of claim 1 wherein a first of said different object representations has a first topology and a second of said different object representations has a second topology different from said first topology.

6. The method of claim 1 wherein two or more of said plurality of different representations correspond to different level of detail representations.

7. The method of claim 2 wherein a different level of detail representation is represented by each of said sets of geometric primitives.

8. The method of claim 1 wherein said sample locations are pseudorandomly distributed within said area of said pixel.

9. The method of claim 1 wherein each of said plurality of different representations is pseudorandomly associated with one of said sample locations.

10. The method of claim 1 wherein the probability that each of said plurity of different representations is pseudo-randomly associated with a particular one of said sample locations varies responsive to image based selection criteria.

11. The method of claim 1 further comprising:
    defining an image based selection criteria for said object in said scene;
    defining overlapping ranges of the selection criteria for which alternative ones of said plurality of different representations of the object may be utilized;
    defining, in said overlapping ranges of the selection criteria, transition functions that prescribe the importance of said alternative representations as a function of the selection criteria; and
    wherein each of said plurality of different representations is associated with said sample locations with probability proportional to said importance of said different representations.

12. The method of claim 11 wherein the selection criteria is the projected raster area of the object's bounding box.

13. The method of claim 11 wherein the transition functions are piecewise linear.

14. The method of claim 11 wherein in overlapping ranges the importance of alternative representations sum to 1 so that the object is not over or under represented in the transition region.

15. The method of claim 1 further comprising:
    establishing partitions of a range of a random variable, each of said partitions associated with one of said different representations of said object;
    determining a value of said random variable for each of said sample locations; and
    wherein associating with each of said sample locations one of said plurality of different representations comprises:
        associating each of said sample locations with one of said plurality of different representations based on the one of said partitions in which said value of said random variable associated with said sample location falls.

16. The method of claim 11 wherein in overlapping ranges the importance of alternative representations sum to less than 1 for smoothing a transition to a state where the object is not visible.

17. The method of claim 11 further comprising:

establishing partitions of a range of a random variable, each of said partitions associated with one of said different representations of said object;

determining a value of said random variable for each of said sample locations; and wherein associating said plurality of different representations with said sample locations with probability proportional to said importance of said different representations comprises:

associating each of said sample locations with one of said plurality of different representations based on the one of said partitions in which said value of said random variable associated with said sample location falls.

* * * * *